(12) United States Patent
Haynes et al.

(10) Patent No.: US 8,131,024 B2
(45) Date of Patent: Mar. 6, 2012

(54) APPARATUS AND METHOD OF IMAGE CAPTURE FOR FACIAL RECOGNITION

(75) Inventors: Simon Dominic Haynes, Fleet (GB); Mark Julian Russell, Maidenhead (GB); Andrew David Kydd, Wokingham (GB)

(73) Assignee: Sony United Kingdom Limited, Weybridge (GB)

( * ) Notice: Subject to any disclaimer, the term of this patent is extended or adjusted under 35 U.S.C. 154(b) by 1013 days.

(21) Appl. No.: 12/057,830

(22) Filed: Mar. 28, 2008

(65) Prior Publication Data

US 2008/0240518 A1    Oct. 2, 2008

(30) Foreign Application Priority Data

Mar. 30, 2007 (GB) .................................. 0706291.2

(51) Int. Cl.
*G06K 9/00* (2006.01)
*G06K 9/46* (2006.01)
*G06K 9/62* (2006.01)
*H04N 5/228* (2006.01)

(52) U.S. Cl. ...... 382/118; 382/195; 382/216; 348/222.1

(58) Field of Classification Search .................. 382/117, 382/118, 190, 195, 203, 209, 216; 348/77, 348/345, 161, 222.1, 207.99; 345/491, 581
See application file for complete search history.

(56) References Cited

U.S. PATENT DOCUMENTS

| | | | | |
|---|---|---|---|---|
| 5,675,663 A * | 10/1997 | Koerner et al. | ............... | 382/181 |
| 5,729,674 A * | 3/1998 | Rosewarne et al. | ........... | 345/634 |
| 5,802,208 A * | 9/1998 | Podilchuk et al. | ............ | 382/224 |
| 5,825,941 A * | 10/1998 | Linford et al. | ................ | 382/294 |
| 6,570,498 B1 * | 5/2003 | Frost et al. | ..................... | 340/540 |
| 6,580,821 B1 * | 6/2003 | Roy | .............................. | 382/154 |
| 6,970,574 B1 * | 11/2005 | Johnson | ........................ | 382/100 |
| 6,999,605 B2 * | 2/2006 | Kitagawa et al. | ............. | 382/118 |
| 7,113,916 B1 * | 9/2006 | Hill | .............................. | 705/7.32 |
| 7,397,932 B2 * | 7/2008 | McAlpine et al. | ............ | 382/118 |
| 7,486,825 B2 * | 2/2009 | Yuasa | ........................... | 382/190 |
| 7,715,595 B2 * | 5/2010 | Kim et al. | ..................... | 382/117 |
| 7,725,829 B1 * | 5/2010 | Wong et al. | .................... | 715/726 |
| 7,739,601 B1 * | 6/2010 | Wong et al. | .................... | 715/731 |
| 7,757,171 B1 * | 7/2010 | Wong et al. | .................... | 715/719 |
| 7,869,630 B2 * | 1/2011 | Matsuhira | ...................... | 382/118 |
| 2003/0043153 A1 * | 3/2003 | Buddemeier et al. | ......... | 345/473 |
| 2004/0140350 A1 * | 7/2004 | Valencia et al. | .............. | 235/375 |
| 2004/0201666 A1 * | 10/2004 | Matsuo et al. | ............. | 348/14.02 |

(Continued)

FOREIGN PATENT DOCUMENTS

JP    2006-121734    5/2006

*Primary Examiner* — Jason M Repko
*Assistant Examiner* — Mia M Thomas
(74) *Attorney, Agent, or Firm* — Oblon, Spivak, McClelland, Maier & Neustadt, L.L.P.

(57) ABSTRACT

An image capture apparatus includes a first imaging device operable to capture an image feedback image. A generator generates a feedback image from a captured image for output to a display. A facial recognition unit operates to determine the position of a face within the feedback image. An image corruptor operates to corrupt the feedback image with respect to the position of a face within the feedback image as determined by the facial recognition unit. An image capture initiator operates to initiate the capture of an output image subsequent to corruption of the feedback image.

20 Claims, 5 Drawing Sheets

U.S. PATENT DOCUMENTS

| | | | |
|---|---|---|---|
| 2005/0026685 A1* | 2/2005 | Ruark et al. | 463/31 |
| 2005/0084137 A1* | 4/2005 | Kim et al. | 382/115 |
| 2006/0177109 A1* | 8/2006 | Storch | 382/118 |
| 2007/0014485 A1* | 1/2007 | McAlpine et al. | 382/276 |
| 2007/0025722 A1* | 2/2007 | Matsugu et al. | 396/263 |
| 2007/0064986 A1* | 3/2007 | Johnson | 382/128 |
| 2007/0174775 A1 | 7/2007 | McAlpine et al. | |
| 2007/0230794 A1* | 10/2007 | McAlpine et al. | 382/190 |
| 2008/0031525 A1* | 2/2008 | Yamaguchi | 382/216 |
| 2008/0240518 A1* | 10/2008 | Haynes et al. | 382/118 |
| 2008/0309662 A1* | 12/2008 | Hassner et al. | 345/419 |
| 2008/0317357 A1* | 12/2008 | Steinberg et al. | 382/209 |
| 2009/0002512 A1* | 1/2009 | Suzuki et al. | 348/222.1 |
| 2009/0219405 A1* | 9/2009 | Kaneda et al. | 348/222.1 |
| 2010/0014719 A1* | 1/2010 | Date et al. | 382/118 |
| 2010/0278396 A1* | 11/2010 | Mitsuhashi et al. | 382/118 |

* cited by examiner

APPARATUS AND METHOD OF IMAGE CAPTURE FOR FACIAL RECOGNITION

BACKGROUND OF THE INVENTION

1. Field of the Invention

This invention relates to an apparatus and method of image capture.

2. Description of the Prior Art

In the field of photography, and more generally of image capture, it is often desirable for the subject of the photograph or image to be smiling. However, particularly in the case of children, the presence of the camera and an unknown camera operator can be intimidating or distracting. This can make it difficult to capture a natural and spontaneous smile or laugh from the child.

In U.S. Pat. No. 5,986,718 (Barwacz et. al.) a photo-booth uses a chromakey system to replace the background in the taken photo with a novelty backdrop, to give the subject the appearance of being in some exotic location or accompanied by a celebrity. Whilst this may add enjoyment to the photography process, it does not solve the problem of encouraging a natural and spontaneous smile or laugh from the subject when the photograph was taken.

It is an object of the present invention to seek to mitigate or alleviate the above problem.

SUMMARY OF THE INVENTION

In a first aspect, an image capture apparatus comprises a first imaging device operable to capture an image feedback image, a generator for generating a feedback image from a captured image for output to a display, a facial recognition unit operable to determine the position of a face within the feedback image, an image corruptor operable to corrupt the feedback image with respect to the position of a face within the feedback image as determined by the facial recognition unit, and an image capture initiator operable to initiate the capture of an output image subsequent to corruption of the feedback image.

In a second aspect, a method of image capture comprises the steps of capturing an image using a first imaging device, generating a feedback image from the captured image for output to a display, detecting the position of a face within the feedback image, corrupting the feedback image with respect to the detected position of a face within the feedback image, and subsequently initiating the capture of an output image.

Advantageously, by corrupting the feedback image, for example in an unusual and/or amusing way, such that for example the subject of the photograph unexpectedly sees a novelty hat or reindeer antlers associated with their face, the subject is likely to smile or laugh unselfconsciously in response, thereby enabling the capture of an output image that remains uncorrupted and which captures their natural response.

Further respective aspects and features of the invention are defined in the appended claims, including but not limited to the following.

In embodiments of the present invention, a graphic image element storage means is provided, the graphic image element storage means being accessible by the image corruption means, and the image corruption means being operable to access one or more graphic image elements from the graphic image element storage means, and corrupt the feedback image by the inclusion of the one or more graphic image elements within the feedback image, wherein the image corruption means is responsive to the position of a face within the feedback image as determined by the facial recognition means to position the one or more included graphic image elements within the feedback image.

Advantageously, therefore, the image corruption features (e.g. the novelty hat or antlers) can be positioned appropriately with respect to the person's face, and in the case of a video feedback image, can track movements of the persons face by constant, periodic or other update from the facial recognition means.

In embodiments of the present invention, the first imaging means comprises auto-focus means, and the image corruption means is responsive to the auto-focus means to initiate corruption of the feedback image.

Partially depressing the shutter button on many cameras activates the camera's auto-focus. Therefore, advantageously, by making the image corruption means responsive to the auto-focus means, a photographer for example can compose a shot and partially depress the shutter button on a camera acting as the first imaging means. Successful focussing on the subject by the auto-focus can then trigger the corruption of the feedback image, engendering a smile in the subject that either the camera itself or the photographer can immediately capture.

In embodiments of the present invention, the facial recognition means is operable to detect a smiling face, and the capture initiation means is operable to initiate the capture of an output image when a smiling face is detected by the facial recognition means.

Advantageously, this enables the automatic capture of the output image when the subject smiles in response to the corruption of the feedback image.

In embodiments of the present invention, the image capture apparatus comprises a second imaging means, and the capture initiation means is operable to initiate the capture of an output image by the second imaging means.

Advantageously, this allows the use of a third party imaging means that may, for example, have a better resolution or optics than the first imaging means, and in the case of a film-based camera may not itself generate an image data signal.

In embodiments of the present invention, the image capture apparatus comprises a display means for displaying the corrupted feedback image and a one-way mirror, the display means being operable to project the feedback image onto the one-way mirror placed in front of that imaging means used to capture the output image.

Advantageously, this encourages the subject to look directly at the imaging means when the output image is captured.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
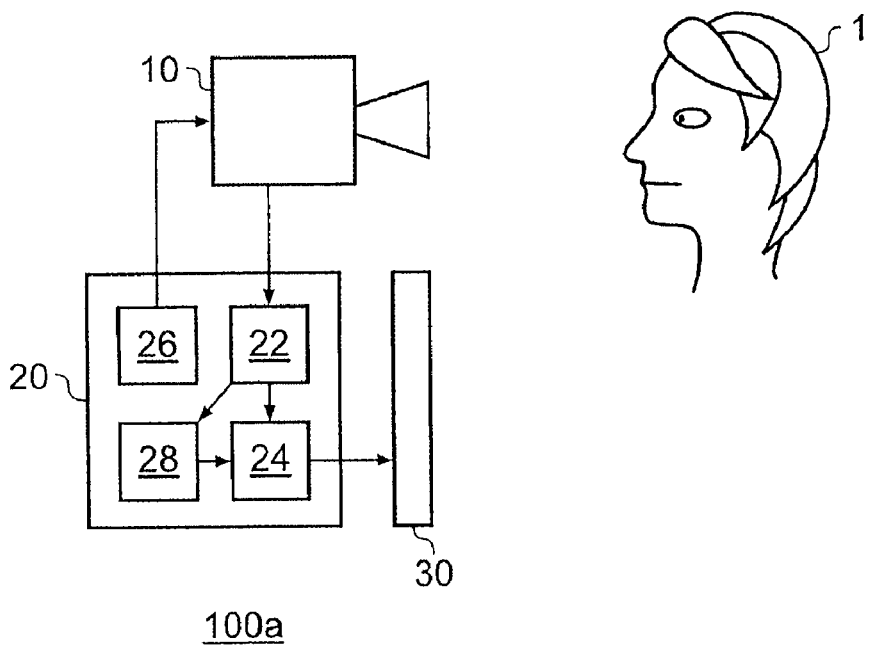
FIG. 1 is a schematic diagram of an image capture device in accordance with an embodiment of the present invention.

Referring now to FIG. 1, in an image capture apparatus 100a according to an embodiment of the present invention, an imaging means 10 such as a digital camera, video camera, WebCam, Eye Toy® camera or similar image capture device is operable to capture images of a subject 1 and supply them to a general purpose computer 20, such as a personal computer (PC), or a Sony® PlayStation 2® entertainment machine, PlayStation 3® entertainment machine or PlayStation Portable® entertainment machine.

The computer 20 in turn comprises—as either software, hardware, or a combination of both—feedback image generation means 22, feedback image corruption means 24 and image capture initiation means 26.

The feedback image generation means 22 takes a signal from the imaging means 10 and formats it in a manner suitable for display on a display means 30 such as a liquid crystal display (LCD), thereby providing feedback about the captured image to the subject of the image, for example a child.

The feedback image corruption means 24 is arranged to take the output of the feedback image generation means and to corrupt the feedback image prior to display on the display means 30.

The corruption may take the form of superposing predefined static or animated graphic image elements over the feedback image; for example, by placing a Santa Claus or other novelty hat or antlers on the head of the person in the feedback image, or any other image elements likely to cause a humorous response in the subject. Such image elements may be recovered by the image corruption means from a graphic image element store (not shown) and placed or included in the image to be corrupted according to face recognition information (see below), e.g. so that the corruption can be aligned with a face in the image. Alternatively the corruption may take the form of an animated or static deformation of the feedback image; for example making the image appear to bulge in and out, and/or undergo a solarisation or other colour manipulation process. Optionally the corruption may be accompanied by a sound via a loudspeaker (not shown) associated with the display means 30.

Typically, some or all of the feedback image generation means 22 and the feedback image corruption means 24 are combined in the form of an application-specific integrated circuit (ASIC) or suitable control software together with programmable graphics hardware, to acquire the captured image from the imaging means 10, apply corruption to the captured image, and output the result to the display means 30.

Image capture for the purpose of generating feedback images may result in a single still image, a periodic succession of still images, or a video image. Consequently, when initiated, image corruption may be applied once, successively, or continuously as appropriate.

The image capture initiation means 26 is operable to initiate the capture of an output image, intended as the output product of the image capture apparatus 100, i.e. as a photograph, or a graphic image for use in a game or as an avatar for a player.

This output image may be captured by the same imaging means 10 used to generate the feedback image, either as a separate, additional capture, or as a feed from the feedback image generation means 22 prior to corruption by the feedback image corruption means.

Figure 2:
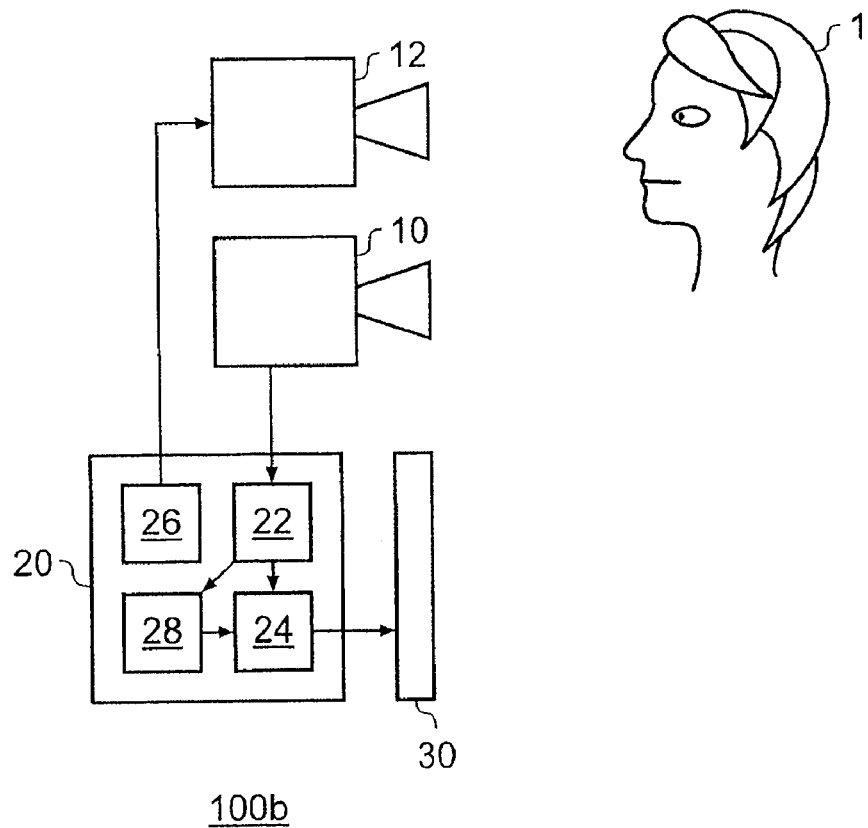
FIG. 2 is a schematic diagram of an image capture device in accordance with another embodiment of the present invention.

Alternatively, and referring now also to FIG. 2, in an image capture apparatus 100b according to an embodiment of the present invention, it may be captured by a second imaging means 12 under the control of the image capture initiation means 26. In this case, the first imaging means may therefore be a relatively cheap device, such as a web-cam built into a laptop computer (the laptop operating as the computer 20), whilst the second imaging means may be a more expensive device able to deliver higher-quality images.

In either case, the resolution of the output image may be the same as that used to generate the feedback image, or may be of a lower or (more typically) higher resolution. In the case of the second imaging means, it will be appreciated that this second imaging means may optionally be a traditional camera using photographic film. It will also be appreciated that a 'final' image does not preclude the taking of further images, but is simply a term for an end product of the image capture apparatus.

In an embodiment of the present invention, the image capture initiation means comprises a shutter button on the image capture means.

In an embodiment of the present invention, the image capture initiation means 26 comprises a timer operable to start when the feedback image is first corrupted. The timer continues until a predetermined duration has elapsed, at which point capture of the output image is initiated. The predetermined duration is empirically determined to be a typical reaction time to the corruption used, such that there is a high likelihood that the subject is smiling or laughing in reaction to the corruption at that point in time. Optionally, different predetermined durations may be used for different corruption schemes. Moreover, a series of images may be captured at different respective times after the feedback image is first corrupted, the capture times being controlled by the image capture initiation means.

It will be appreciated by a person skilled in the art that the corruption of the feedback image may itself be initiated by the photographer when they consider the person or persons whose picture is being taken to be ready. Alternatively or in addition it may be initiated by a self timer, or by an event in software of the computer, such as a flag indicating that a previous photo has been stored and the computer is ready to process another.

Alternatively or in addition, the corruption of the feedback image may be initiated by the image capture means (i.e. camera), for example when the camera's auto-focus indicates that the subject is in focus. Typically such auto-focus systems are in turn themselves activated when the photographer partially depresses the shutter button on the camera. In the event that the auto-focus system itself uses facial-recognition means to identify the subject of focus, optionally this may be combined with the facial recognition means referred to herein. It will be understood that the relevant auto-focus is that of the imaging means that will capture the output image, although optionally the image corruption means may be responsive to successful focussing only by both imaging means if two are used.

Similarly, to entice a natural smile or laughter response over a succession of photographs, it will be appreciated that optionally the corruption may be one of several successively or randomly chosen from a selection of possible corruptions. For example, a variety of graphic image elements may be available for selection, such as a clown nose, party hat, so-called 'Groucho Marx' glasses, donkey ears or a humorous wig. One or more may be used for each corruption.

To facilitate placement of these graphic image elements, in an embodiment of the present invention the image corruption means utilises a facial recognition means 28 to determine the location of at least a first subject in the feedback image for the purposes of placement of graphic image elements. In an embodiment of the present invention, the facial recognition means 28 implements a facial detection algorithm as described below.

Many suitable human-face detection algorithms have been proposed in the literature, including the use of so-called eigenfaces, face template matching, deformable template matching or neural network classification.

One face detection algorithm is disclosed in PCT/GB2003/005186, and reference is made to that application for fuller details of the technical features summarised here. Features disclosed in PCT/GB2003/005186 which are not explicitly referred to in the following summary description should still be considered as (at least optional) features of the present facial recognition means.

Figure 3:
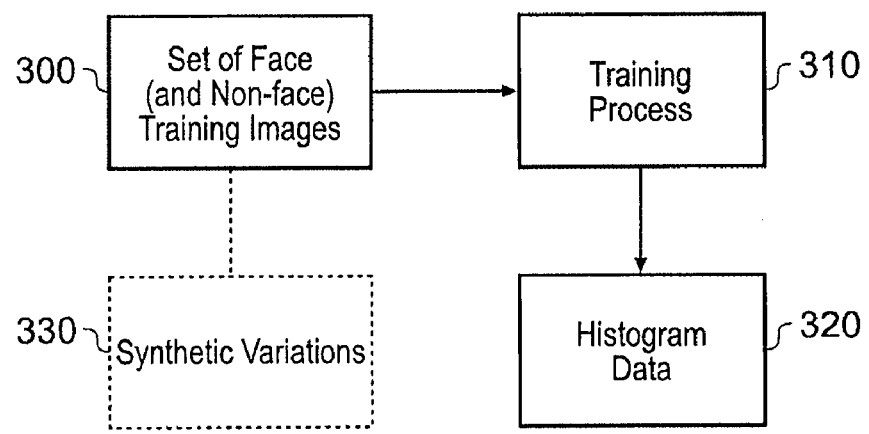
FIG. 3 is a schematic diagram illustrating a facial detection training phase in accordance with an embodiment of the present invention.
Figure 4:
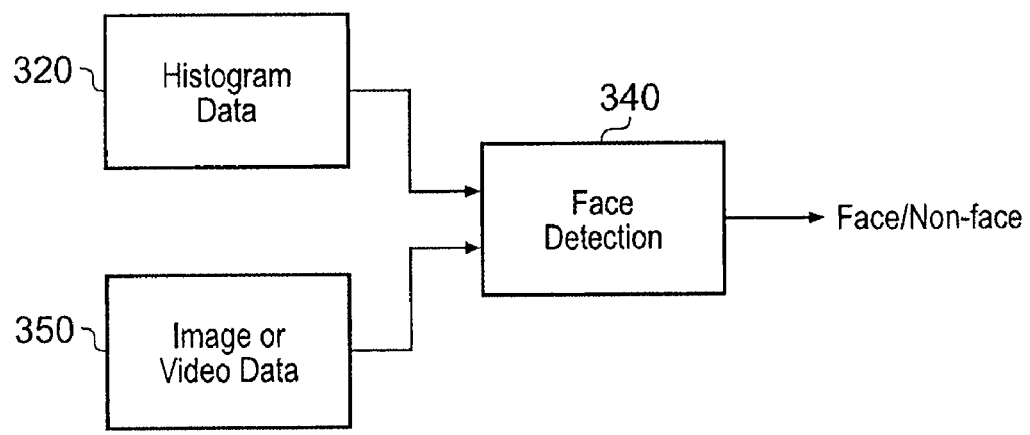
FIG. 4 is a schematic diagram illustrating a facial detection phase in accordance with an embodiment of the present invention.

The present embodiment uses a face detection technique arranged as two phases. FIG. 3 is a schematic diagram illustrating a training phase, and FIG. 4 is a schematic diagram illustrating a detection phase.

Unlike some previously proposed face detection methods, the present method is based on modelling the face in parts instead of as a whole. The parts can either be blocks centred over the assumed positions of the facial features (so-called "selective sampling") or blocks sampled at regular intervals over the face (so-called "regular sampling"). The present description will cover primarily regular sampling, as this was found in empirical tests to give the better results.

In the training phase, an analysis process is applied to a set of images known to contain faces, and (optionally) another set of images ("nonface images") known not to contain faces. The process can be repeated for multiple training sets of face data, representing different views (e.g. frontal, left side, right side) of faces. The analysis process builds a mathematical model of facial and nonfacial features, against which a test image can later be compared (in the detection phase).

So, to build the mathematical model (the training process 310 of FIG. 3), the basic steps are as follows:

i. From a set 300 of face images normalised to have the same eye positions, each face is sampled regularly into small blocks.

ii. Attributes are calculated for each block;

iii. The attributes are quantised to a manageable number of different values.

iv. The quantised attributes are then combined to generate a single quantised value in respect of that block position.

v. The single quantised value is then recorded as an entry in a histogram. The collective histogram information 320 in respect of all of the block positions in all of the training images forms the foundation of the mathematical model of the facial features.

One such histogram is prepared for each possible block position, by repeating the above steps in respect of a large number of test face images. So, in a system which uses an array of 8×8 blocks, 64 histograms are prepared. In a later part of the processing, a test quantised attribute is compared with the histogram data; the fact that a whole histogram is used to model the data means that no assumptions have to be made about whether it follows a parameterised distribution, e.g. Gaussian or otherwise. To save data storage space (if needed), histograms which are similar can be merged so that the same histogram can be reused for different block positions.

Such histograms may be generated prior to manufacture of the facial detection means, and pre-stored in a manner accessible by the facial detection means for the purposes of detection within the feedback image.

In the detection phase, to apply the face detector to a test image 350 (such as the feedback image), successive windows in the test image are processed 340 as follows:

vi. The window is sampled regularly as a series of blocks, and attributes in respect of each block are calculated and quantised as in stages 1-4 above.

vii. Corresponding "probabilities" for the quantised attribute values for each block position are looked up from the corresponding histograms. That is to say, for each block position, a respective quantised attribute is generated and is compared with a histogram previously generated in respect of that block position (or with multiple histograms in the case of multiple training sets representing different views). The way in which the histograms give rise to "probability" data will be described below.

viii. All the probabilities obtained above are multiplied together to form a final probability which is compared against a threshold in order to classify the window as "face" or "nonface". It will be appreciated that the detection result of "face" or "nonface" is a probability-based measure rather than an absolute detection. Sometimes, an image not containing a face may be wrongly detected as "face", a so-called false positive. At other times, an image containing a face may be wrongly detected as "nonface", a so-called false negative. It is an aim of any face detection system to reduce the proportion of false positives and the proportion of false negatives, but it is of course understood that to reduce these proportions to zero is difficult, if not impossible, with current technology.

As mentioned above, in the training phase, a set of "nonface" images can be used to generate a corresponding set of "nonface" histograms. Then, to achieve detection of a face, the "probability" produced from the nonface histograms may be compared with a separate threshold, so that the probability has to be under the threshold for the test window to contain a face. Alternatively, the ratio of the face probability to the nonface probability could be compared with a threshold.

Extra training data may be generated by applying "synthetic variations" 330 to the original training set, such as variations in position, orientation, size, aspect ratio, background scenery, lighting intensity and frequency content.

Faces are located within the captured image by applying the facial detection test centred within test windows, the test windows typically being sub-regions of the image. By positioning test windows across the image, the position of detected faces can be determined. The size of a face can be determined from the size of the test window giving the highest probability score at that image position.

The facial detection means can therefore provide information regarding the position and size of a face in the feedback image to the feedback image corruption means, allowing suitable placement and scaling of selected graphic image elements on or around the face and head of the subject.

In addition, in an embodiment of the present invention the training and classification sets for faces are split into 'smiling' and 'non-smiling' faces, allowing the facial detection means to determine when a subject of the feedback image is smiling or laughing. When the subject is determined to be smiling or laughing, this information is provided to the image capture initiation means, in order to automatically initiate capture an output image when a subject of the photograph smiles. Optionally, a further small delay may be included to improve the probability of a full smile.

It will be appreciated that, in a similar way to the combination of the feedback image generation means 22 and the feedback image corruption means 24 noted previously, some or all of the facial detection means 28 can optionally be combined with the feedback image generation means 22, the feedback image corruption means 24, or both, for example in the form of an ASIC or a combination of software and programmable graphics hardware. Moreover, as noted previously, in embodiments of the present invention the image capture initiation means 26 is responsive to events from the feedback image corruption means 24 or the facial detection means 28. Consequently some or all of the image capture initiation means 26 may likewise be combined with either of these means, and thus in turn with the feedback image generation means 22 in likewise fashion.

Figure 5:
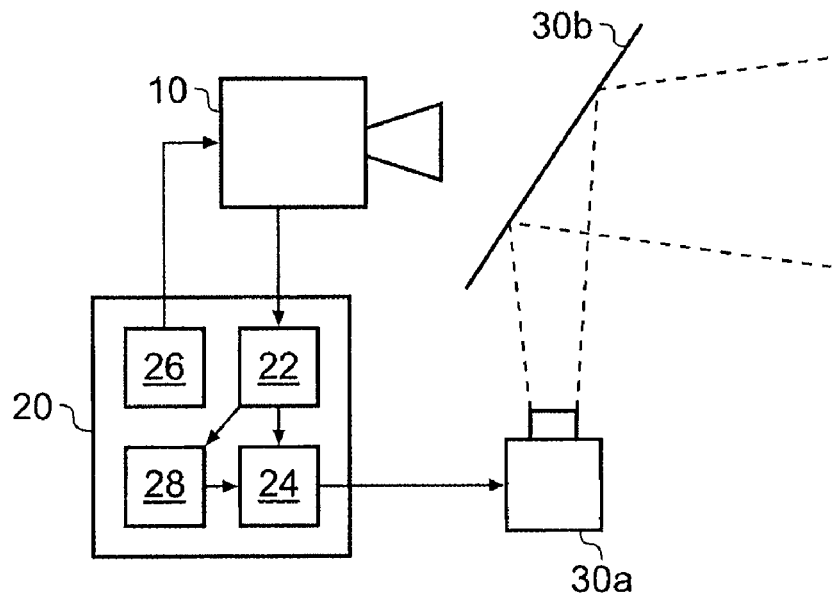
FIG. 5 is a schematic diagram of an image capture device in accordance with an embodiment of the present invention.
Figure 6:
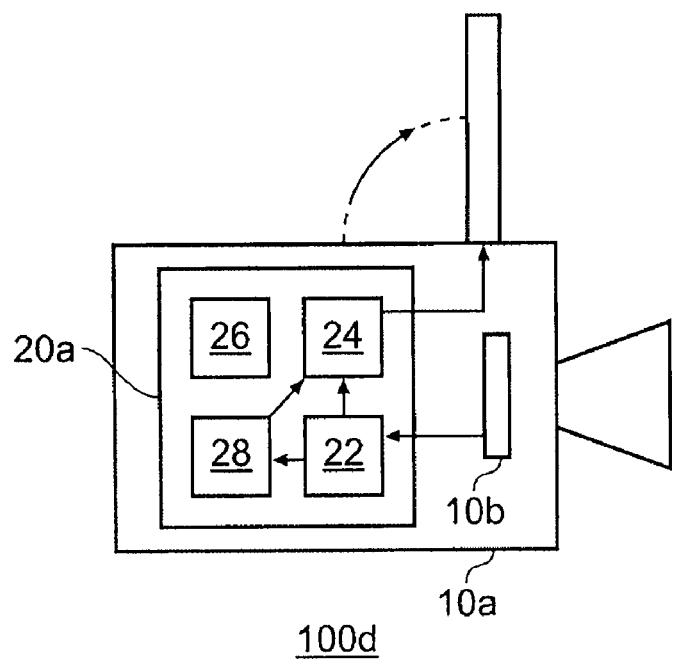
FIG. 6 is a schematic diagram of an image capture device in accordance with an embodiment of the present invention.

Referring now to FIGS. 5 and 6, in an embodiment of the present invention the feedback image is placed as close as practical to the imaging means used to capture the output image. This is because the subject of the photograph is likely to be looking at the feedback image when the output image is captured, whereas it is desirable for them to be looking as closely toward the imaging means as possible.

In FIG. 5, in an image capture apparatus 100c according to an embodiment of the present invention a display means 30a projects the feedback image onto a one-way mirror 30b, arranged in from of the imaging means 10, so that the subject is effectively staring directly at the imaging means as they look at the feedback image. The projector and the one-way, or so-called 'transparent', mirror arrangement is therefore similar to that of an autocue or teleprompt. The display means and mirror may be a single unit, and in turn may be fixed to or integral with the imaging means 10. It will of course be appreciated that the term "one-way" does not necessarily imply exactly 100% transmission in one direction and exactly 0% (or exactly 100% reflection) in another, but rather a practical arrangement which generally favours transmission in one direction and reflection in another.

Referring now to FIG. 6, in an image capture apparatus 100d according to an embodiment of the present invention an imaging means 10a comprises a computer 20a operable as described previously and operable to receive input from the charge coupled device 10b of the imaging means 10a. In this embodiment, optionally the display means 30c is integral or attachable to the imaging means 10a, and may be fixed with respect to the lens of the imaging means, or be rotatable, slidable or otherwise deployed to face the subject when required.

Figure 7:
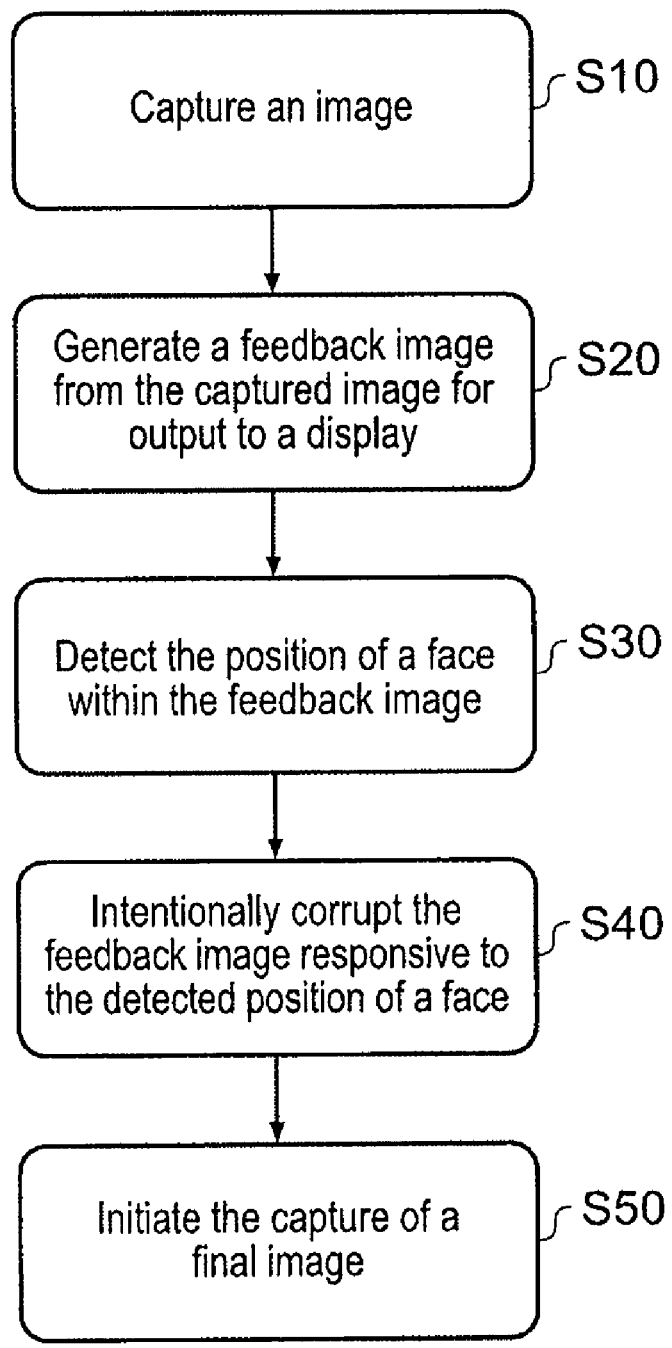
FIG. 7 is a flow diagram of a method of image capture in accordance with an embodiment of the present invention.

Referring now to FIGS. 7 and 8, a method of image capture comprises:

in a first step, capturing (s10) an image using a first imaging means;

in a second step, generating (s20) a feedback image from the captured image for output to a display;

in a third step, detecting (s30) the position of a face within the feedback image;

in a fourth step, intentionally corrupting (s40) the feedback image responsive to the detected position of a face within the feedback image; and in a fifth step, subsequently initiating (s50) the capture of an output image.

Figure 8A:
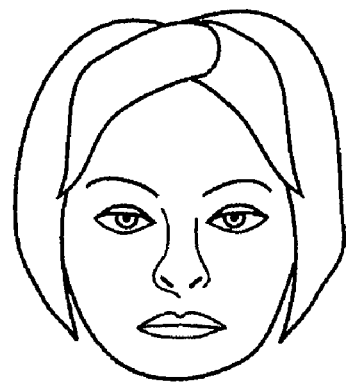
FIGS. 8a to 8c are schematic diagrams of feedback images and an output image in accordance with an embodiment of the present invention.
Figure 8B:
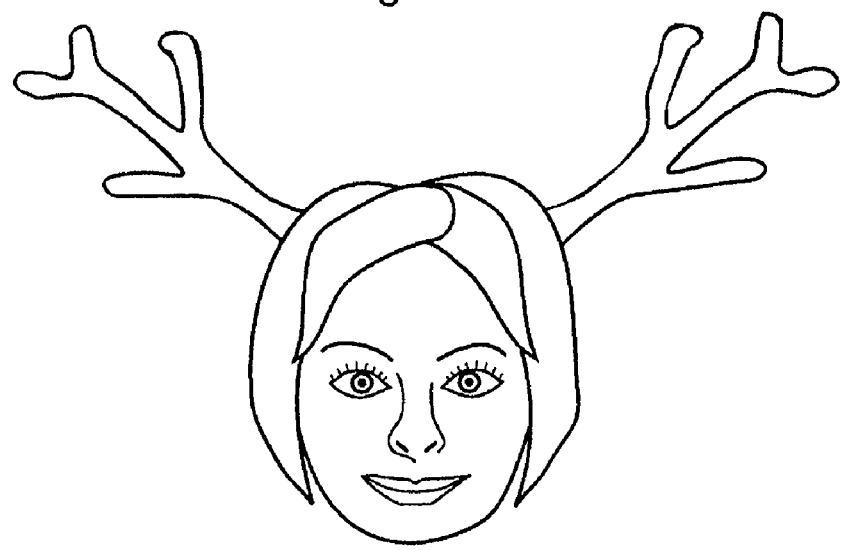
Figure 8C:
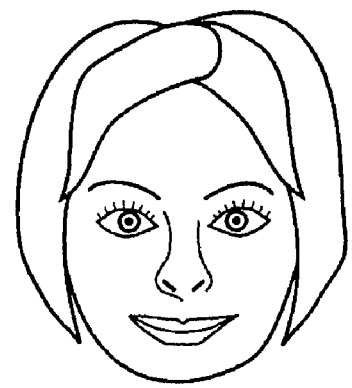

FIGS. 8a to 8c illustrates the second (s20), fourth (s40) and fifth (s50) steps in terms of the images obtained;

In FIG. 8a, an image has been captured of the subject showing a neutral expression, and used to generate the feedback image shown.

In FIG. 8b, the feedback image is corrupted, here by positioning a graphic image element resembling antlers on the head of the subject, who is shown smiling in response.

FIG. 8c shows an output image captured for output as the end product of the process which is notably not corrupted, thereby providing a clean image of the subject whilst smiling.

It will be apparent to a person skilled in the art that variations in the above method corresponding to operation of the various embodiments of the apparatus disclosed above are considered within the scope of the present invention, including but not limited to:

that the initiation of the capture of the output image may be by an timer dependent upon the point at which the feedback image is corrupted;

that the initiation of the capture of the output image may be controlled by a face recognition process operable to detect a smiling face;

that the feedback image corruption may comprise static or animated graphic image elements superposed on the feedback image, or transformations of the feedback image, or both;

that the feedback image corruption may be initiated by a photographer, a timer, a computer program event or the achieving of auto-focus or appropriate combinations of any of these.

It will be appreciated that in embodiments of the present invention, elements of the method of image capture may be implemented in the computer, imaging means or display means in any suitable manner, including that the computer and imaging means may be a single unit, or that the computer, imaging means and display means are a single unit.

As noted previously, feedback image generation means 22, feedback image corruption means 24 and image capture initiation means 26 may be implemented in either hardware or software, and moreover may be implemented in suitably adapted imaging means, display means or computer in any suitable combination.

Thus adapting existing parts of a conventional equivalent may comprise for example reprogramming one or more processors therein. As such the required adaptation may be augmented in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these or other networks.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image capture apparatus, comprising:
   a display;
   a first imaging device operable to capture a first image;
   a feedback image generator for generating a feedback image from said first image;
   a facial recognition unit operable to determine a position of a face within said feedback image;
   an image corruptor operable to corrupt said feedback image with respect to said position of a face within said feedback image as determined by said facial recognition unit to generate a corrupted feedback image for output to said display; and an image capture initiator operable to initiate capture of a second image by said first imaging device or a second imaging device subsequent to corruption of said feedback image and said display of said corrupted feedback image;

in which:

said display is integral with that one of said first imaging device and said second imaging device which is used to capture said second image; and said second image is not corrupted by said image corruptor.

2. The image capture apparatus according to claim 1, further comprising:

a graphic image element store, said graphic image element store being accessible by said image corruptor; and said image corruptor being operable to:

access one or more graphic image elements from said graphic image element store; and corrupt said feedback image by the inclusion of said one or more graphic image elements within said feedback image.

3. The image capture apparatus according to claim 2, wherein said image corruptor is responsive to said position of a face within said feedback image as determined by said facial recognition unit to position said one or more included graphic image elements within said feedback image.

4. The image capture apparatus according to claim 1, wherein said first imaging device comprises:

an auto-focus arrangement, wherein said image corruptor is responsive to said auto-focus arrangement to initiate corruption of said feedback image.

5. The image capture apparatus according to claim 1, wherein, said facial recognition unit is operable to detect a smiling face, and said capture initiator is operable to initiate said capture of an output image in response to a detection of a smiling face by said facial recognition unit.

6. The image capture apparatus according to claim 1, wherein said image capture initiator comprises:

a timer arranged in operation to commence when said image corruptor first corrupts said feedback image, and to initiate said capture of an output image when said timer reaches a predetermined duration.

7. The image capture apparatus according to claim 1, further comprising:

a second imaging device, wherein said image capture initiator is operable to initiate said capture of an output image by said second imaging device.

8. The image capture apparatus according to claim 1, further comprising:

a display for displaying said corrupted feedback image.

9. The image capture apparatus according to claim 8, further comprising:

a one-way mirror, wherein said display is a projector, said display being operable to project said feedback image onto said one-way mirror placed in front of that imaging device used to capture said output image.

10. The image capture apparatus according to claim 8, wherein said display is substantially adjacent to that imaging device used to capture said output image.

11. A non-transitory computer-readable storage medium having computer readable instructions stored thereon that, when executed by a computer, cause said computer to operate as an image capture apparatus according to claim 1.

12. A method of image capture, said method comprising:

utilizing a display;

capturing a first image using a first imaging device;

generating by a data processing device a feedback image from said first image;

detecting by said data processing device a position of a face within said feedback image;

corrupting by said data processing device said feedback image with respect to said detected position of a face within said feedback image to generate a corrupted feedback image for output to said display; and subsequently initiating capture of a second image by said first imaging device or a second imaging device, subsequent to corruption of said feedback image and said display of said corrupted feedback image;

in which:

said display is integral with that one of said first imaging device and said second imaging device which is used to capture said second image; and said second image is not corrupted by said image corruptor.

13. The method of image capture according to claim 12, wherein corrupting said feedback image comprises:

the placement of one or more graphic image elements within said feedback image.

14. The method of image capture according to claim 13, further comprising:

recognizing one or more faces in said feedback image; and determining placement of said one or more graphic image elements in relation to said one or more recognized faces.

15. The method of image capture according to claim 12, wherein, said detecting said position of a face within said feedback image comprises detecting whether said face is smiling, and said initiating said capture of an output image is responsive to whether a smiling face is so detected.

16. The method of image capture according to claim 12, wherein said initiating said capture of an output image comprises:

timing the duration from when said feedback image is corrupted until a predetermined duration is reached; and subsequently initiating capture of said output image.

17. The method of image capture according to claim 12, further comprising:

displaying said corrupted feedback image.

18. The method of image capture according to claim 17, wherein said displaying said corrupted feedback image comprises:

projecting said feedback image onto a one-way mirror placed in front of that imaging device used to capture said output image.

19. The method of image capture according to claim 17, wherein said displaying said corrupted feedback image comprises:

displaying said feedback image substantially adjacent to said imaging device used to capture said output image.

20. A non-transitory computer-readable storage medium having computer readable instructions stored thereon that, when executed by a computer, cause said computer to carry out the method of claim 12.

* * * * *